United States Patent [19]

Weidman et al.

[11] Patent Number: 4,883,626
[45] Date of Patent: Nov. 28, 1989

[54] METHOD OF MOLDING A MANHOLE FRAME FOR SPHERICAL TANKS

[75] Inventors: William J. Weidman, Old Tappan, N.J.; Edmund Netz, Rego Park, N.Y.

[73] Assignee: Cardinal Tank Corp., Brooklyn, N.Y.

[21] Appl. No.: 274,274

[22] Filed: Nov. 21, 1988

Related U.S. Application Data

[62] Division of Ser. No. 29,625, Mar. 24, 1987, Pat. No. 4,818,211.

[51] Int. Cl.$^4$ .......................... B28B 1/48; B28B 7/16; B28B 1/34; B29C 33/40
[52] U.S. Cl. .................................. 264/156; 264/219; 264/308; 264/309; 264/310; 264/DIG. 72; 425/425
[58] Field of Search ....... 264/308, 309, 310, DIG. 41, 264/DIG. 72, 294, 318, 255, 311, 156, 219; 425/425

[56] References Cited

U.S. PATENT DOCUMENTS

| | | | |
|---|---|---|---|
| 3,309,762 | 3/1967 | Harper | 264/311 |
| 3,461,009 | 8/1969 | Snyder et al. | 264/318 |
| 3,783,060 | 1/1974 | Goldsworthy et al. | 264/311 |
| 4,088,808 | 5/1978 | Cornwell et al. | 264/309 |
| 4,705,468 | 11/1987 | LeBreton | 425/116 |

FOREIGN PATENT DOCUMENTS

2930365  2/1980  Fed. Rep. of Germany ...... 264/311

Primary Examiner—Jan H. Silbaugh
Assistant Examiner—Mathieu Vargot
Attorney, Agent, or Firm—Lackenbach Siegel Marzullo & Aronson

[57] ABSTRACT

A access-hole frame for the construction of a spherical tank made of nonmetal moldable material, the frame having a cylindrical neck, an outwardly extending flange at the top side of the neck, and a collar configured as a segmented sphere to be integrated with the spherical wall of the tank. Bolt holes are drilled around the flange for bolts that hold an access-hole cover to the access-hole frame. A three-piece die provided for making the access-hole frame includes a bottom die piece and two top pieces that are bolted together to form an integral top die piece that fits over the bottom die piece. The access-hole frame is formed in accordance with a manufacturing process by placing the three-piece die in stages upon a rotatable table and spraying the nonmetal moldable material onto the rotating bottom and top die pieces.

10 Claims, 5 Drawing Sheets

METHOD OF MOLDING A MANHOLE FRAME FOR SPHERICAL TANKS

This is a division of application Ser. No. 029,625, filed 3/24/87, now U.S. Pat. No. 4,818,211.

FIELD OF THE INVENTION

This invention relates to spherical molded tanks made of nonmetal material, and in particular to manhole access frames for such spherical tanks.

BACKGROUND OF THE INVENTION

All closed containers or vessels have access openings to the internal parts of the vessels. The access openings are variously known as manholes, hatches, and so on. The manhole is formed by a manhole frame. The configuration of the manhole frame varies in accordance with the geometry of the tank.

The subject of the present invention is a manhole frame for a spherical tank of the type used for underground storage of fluid materials, typically petroleum products. Spherical tanks in the current art are generally made of a filament, generally fiberglass, which is wound around an inflatable and deflatable ball, or mandrel. Manhole frames are prepared in advance and then fitted over the inflated mandrel. The spherical tank is then formed by a glass strand roving process known in the art as filament winding that incorporates the manhole frame, which becomes an integral part of the formed spherical tank. After completion of the spherical tank, the mandrel is collapsed and withdrawn from the tank through the manhole.

The old art of producing manhole frames for spherical tanks, which were formerly made of steel as were the tanks, is generally followed in the current art even though the spherical tanks and their manhole frames are made of nonmetal moldable materials rather than of metal. Both the old art and the present art use injection molds, or dies, to produce the manhole frames.

Figure 1:
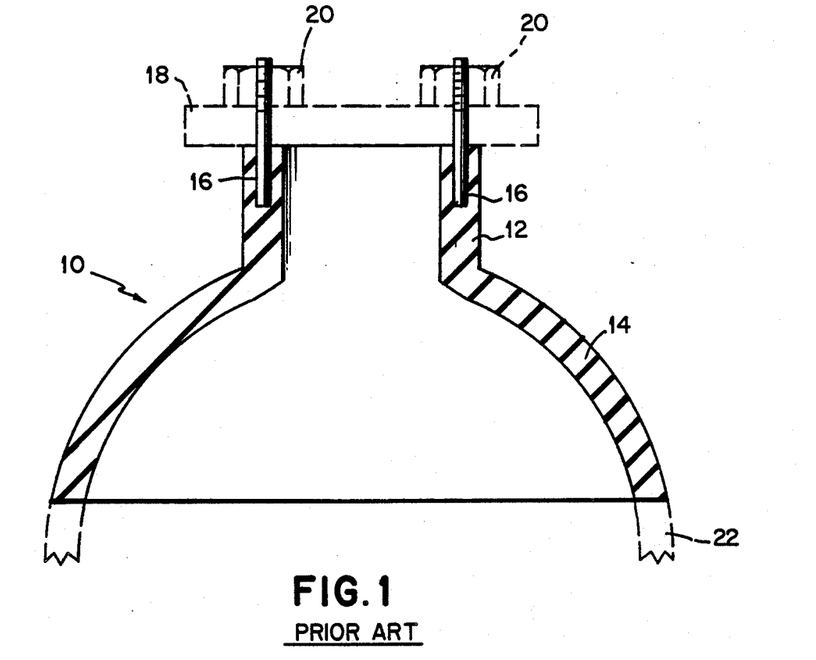
FIG. 1 is a sectional side view of a prior art manhole frame also illustrating a closure plate and a portion of a spherical tank in phantom line.
Figure 2:
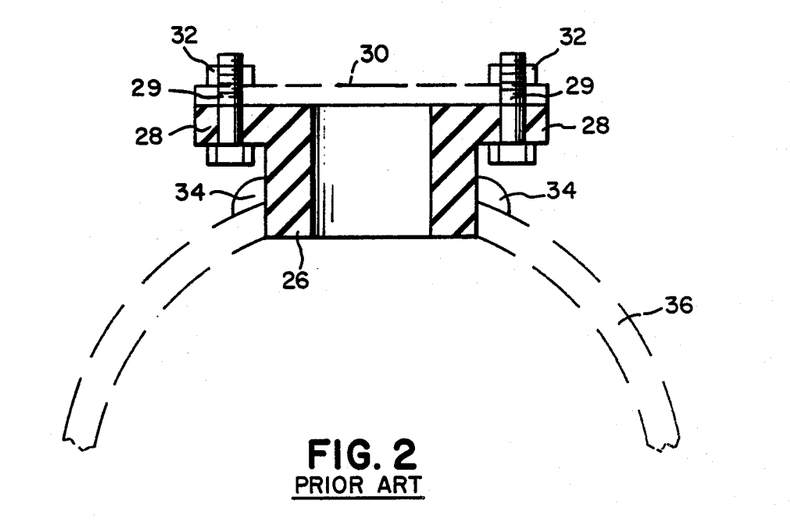
FIG. 2 is a sectional side view of a prior art manhole frame also illustrating a closure plate and a portion of a spherical tank in phantom line.

Two basic types of manhole frames are known in the art. These types are shown in FIGS. 1 and 2, which are discussed in detail later. Both of these manhole frames follow the types used when spherical tanks were made of metal rather than fiberglass or plastic. The first type of manhole frame, which is illustrated in FIG. 1, includes a neck with a collar and bolts integral with the neck for later attachment with a closure plate The bolts tend to loosen because of an inherent inability of the bolts to be firmly held by the resin that surrounds them with resultant leaking and maintenance expenses later. Another problem arises during molding when the resin tends to run downwardly onto the bolt threads. The second type of manhole frame, which is illustrated in FIG. 2, includes a neck connected to a manhole flange having bolt holes for bolts to be added later. This type of frame must be reinforced at the joint between the neck and the spherical tank by added spraying around the joint at added cost. Problems with leakage at the reinforcing arise with associated maintenance expenses.

SUMMARY OF THE INVENTION

Accordingly, it is an object of this invention to provide a manhole frame for spherical tanks formed with nonmetal moldable materials that overcomes the disadvantages of the prior art.

It is another object of this invention to provide a manhole frame for spherical tanks formed with nonmetal moldable materials which is inexpensive to manufacture and reduces the possibilities of subsequent leakage.

It is another object of this invention is to provide an inexpensive die for a manhole frame for spherical tanks formed with nonmetal moldable materials and which makes possible the production of the moldable manhole frame at a very low cost.

It is yet another object of this invention to provide an inexpensive method of manufacturing the manhole frame in accordance with the present invention.

Accordingly, in order to achieve the above objects and others that will become apparent hereafter, I have devised an inventive manhole frame made of nonmetal moldable material for spherical tanks that includes the advantageous features and excludes the disadvantageous features of the prior art discussed above. In addition, I have devised an inexpensive three-piece die that makes possible the formation of the inventive manhole frame at a very low cost. Also, in association with the three-piece die I have devised an inexpensive method of producing the inventive manhole frame. In particular, there is provided a manhole frame for the construction of a spherical tank made of nonmetal moldable material, the frame having a cylindrical neck, an outwardly extending flange at the top side of the neck, and a partly spherical collar to be integrated with the spherical wall of the tank. Bolt holes are drilled around the flange for bolts that hold a manhole cover to the manhole frame A three-piece die provided for making the manhole frame includes a bottom die piece and two top pieces that are bolted together to form an operational top die piece that fits over the bottom die piece The manhole frame is formed in accordance with a manufacturing process by placing the three-piece die in stages upon a rotatable table and spraying the nonmetal moldable material onto the rotating bottom and top die pieces The present invention will be better understood and the objects and important features, other than those specifically enumerated above, will become apparent when consideration is given to the following details and description, whcih when taken in conjunction with the annesed drawings, describes, discloses, illustrates, and shows a preferred embodiment or modification of the present invention and what is presently considered and believed to be the best mode of practice in the principles thereof Other embodiments or modifications may be suggested to those having the benefits of the teachings herein and such other embodiments or modifications are intended to be reserved especially as they fall within the scope and spirit of the subjoined claims.

DESCRIPTION OF THE PREFERRED EMBODIMENT

FIG. 1 illustrates a manhole frame 10 having a cylindrical neck 12 and a circular, curved collar 14 connected to the lower circular edge of neck 12. Collar 14 is dimensioned in accordance with the dimensions of the spherical tank with which it will become integral. A plurality of bolts 16 embedded at equal distances in neck 12 extend upwardly from the edge of the neck. A removable, cylindrical manhole cover, or closure plate, 18, is secured to neck 12 by nuts 20 after the completion of the finished spherical tank 22, all shown in phantom line. Manhole frame 10 is made with a one-piece die that forms neck 12 and collar 14 in a position inverted from the orientation shown in FIG. 1. There are several problems associated with this prior art. One problem is that bolts 16 are difficult to orient in a straight upward orientation with consequent problems in maintenance as time goes by since bolts 16 tend to loosen. Another problem is that bolts 16 are not well bonded in neck 12 since they are held in place by plastic, not by steel as in the old art. Also, resin being spray applied to the one-piece die tends to run downwardly into the threads of bolts 16 so as to interfere subsequently with screwing on of nuts 20; this problem can be alleviated, but only with extra labor and expense.

FIG. 2 illustrates a manhole frame 24 having a cylindrical neck 26 and a manhole flange 28 connected to the top circular edge of neck 26. A plurality of bolts 29 having bottom-side bolt heads and topside nuts 32 are mounted through a plurality of bolt holes in manhole flange 28 and extend through mating bolt holes in a closure plate 30, all shown in phantom line. Nuts 32 are screwed onto the topside threads of bolts 29 so as to hold closure plate 30 to manhole frame 24. Manhole frame 24 is formed on a two-piece die. The bolt holes are drilled after the resin has hardened. The primary problem with manhole frame 24 is that in order to secure neck 26 to spherical tank 36, shown in phantom line, a circular support 34 must be sprayed between the outer surfaces of spherical tank 36 and neck 26. This results in significant additional labor cost to the final product. Also, it is not uncommon for loosening between neck 26 and tank 36 to develop after installation with resulting maintenance costs.

Figure 3:
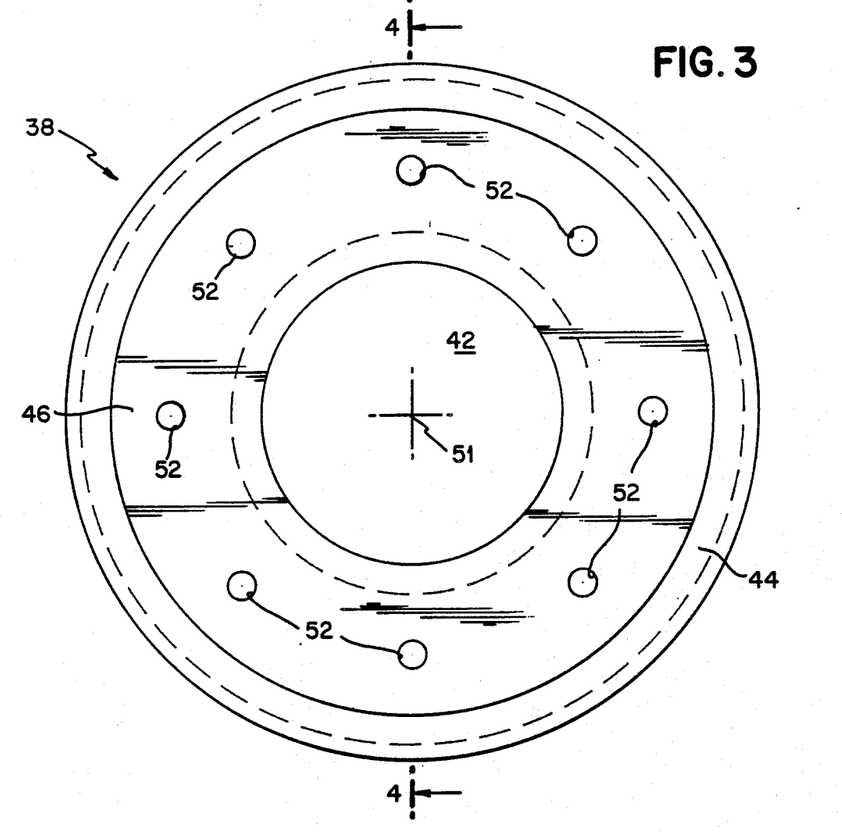
FIG. 3 is a top view of the completed manhole frame.
Figure 4:
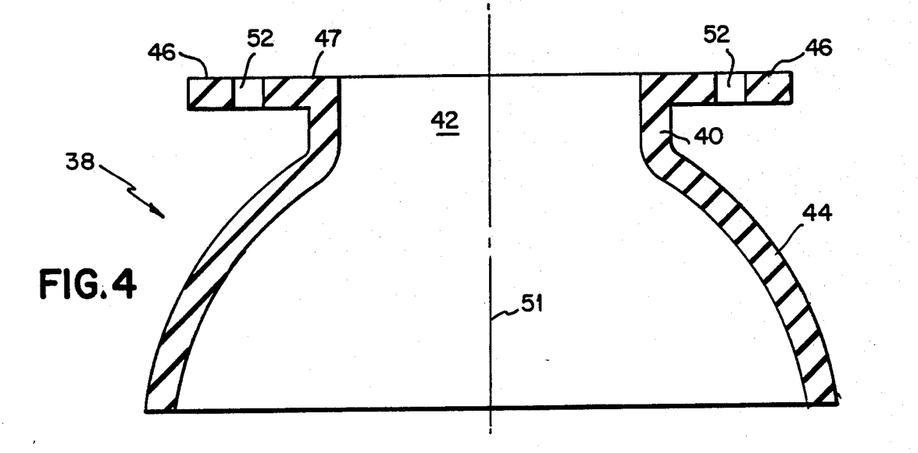
FIG. 4 is a view taken through line 3—3 in FIG. 3.

FIGS. 3 and 4 illustrate a completely formed manhole frame 38 according to the present invention that includes a cylindrical neck 40 defining an access hole, or manhole, 42, a partially spherical collar 44 connected to the circular bottom-side edge of neck 40, and an outwardly radially extending cylindrical manhole flange 46 having a circular inner edge 47 connected to the topside circular edge of neck 40. Collar 44 tapers downwardly from neck 40 in conformal integration with the spherical wall 48 of a completely formed spherical tank 50 illustrated in FIG. 5. Cylindrical manhole 42 has an axis 51 that is coextensive with a radius that extends from the center 53 of tank 48. Manhole frame 38 is integrally formed with spherical tank 48 as indicated by bracketing in FIG. 5. A plurality of equally spaced, circularly and concentrically positioned bolt holes, shown as eight bolt holes 52 for purposes of illustration, are located in manhole flange 46. The thickness of the wall of manhole flange 46 is preferably somewhat thicker than the thickness of the wall of collar 44, which is of the thickness of wall 48 of spherical tank 50 as preferably is the thickness of the wall of neck 40. Manhole frame 38 is made of a moldable, nonmetal material, preferably resin reinforced with chopped fiberglass. Other moldable, nonmetal materials that can be used include plastic materials, such as epoxy resin and polypropylene.

Figure 5:
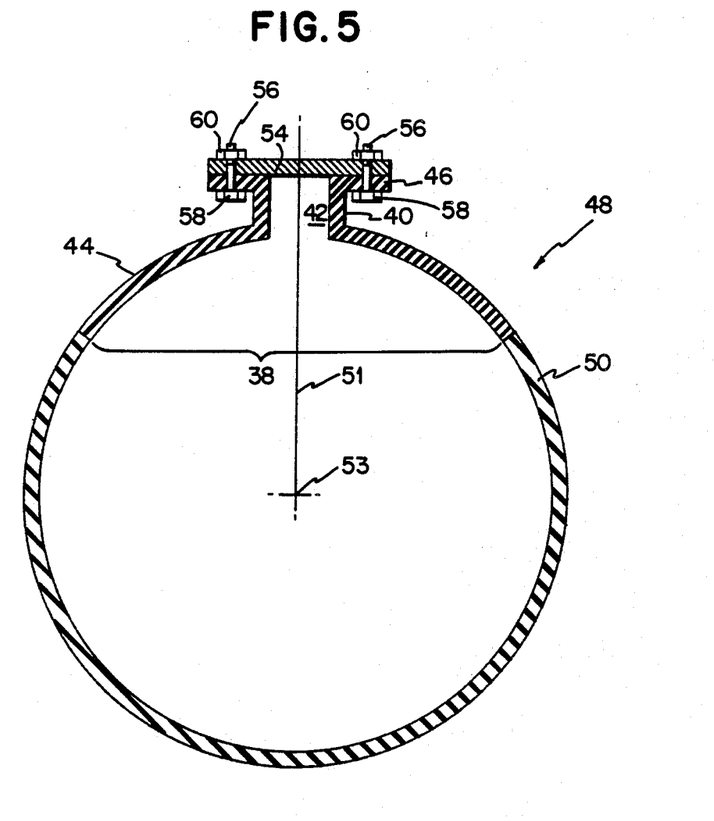
FIG. 5 is a midsectional view of a formed spherical tank including the manhole frame shown in FIG. 3 integral with the tank.

Completed manhole frame 38 is integrated in the formation of spherical tank 48 during a process known in the art. This process is briefly summarized as follows. Manhole frame 38 is sandblasted to produce a rough surface and is then positioned on a steel female section of an inflatable mandrel and bolted in place. An outwardly expanding chuck slips into the female steel section above and expands at a pressure to hold the inflatable mandrel. The inflated mandrel is then wound in a multi-directional process known as filament winding. A fiberglass strand roving is wetted out through a resin bath and is then directed to overlay the sandblasted collar of manhole frame 38 in multi-directional and multi-layer laminations. Manhole frame 38 then becomes an integral part of spherical tank 48. After the resin has cross-linked and hardened, the inflated mandrel is deflated and is removed through manhole 42.

A closure plate 54 illustrated in FIG. 5 bolted in place to manhole frame 38 is bolted to the topside of manhole flange 46 by bolts 56, which extend through bolt holes 52. Bolt heads 58 are preferably positioned on the bottom side of manhole flange 46, and nuts 60 are screwed onto the topside threads of bolts 56.

Figure 6:
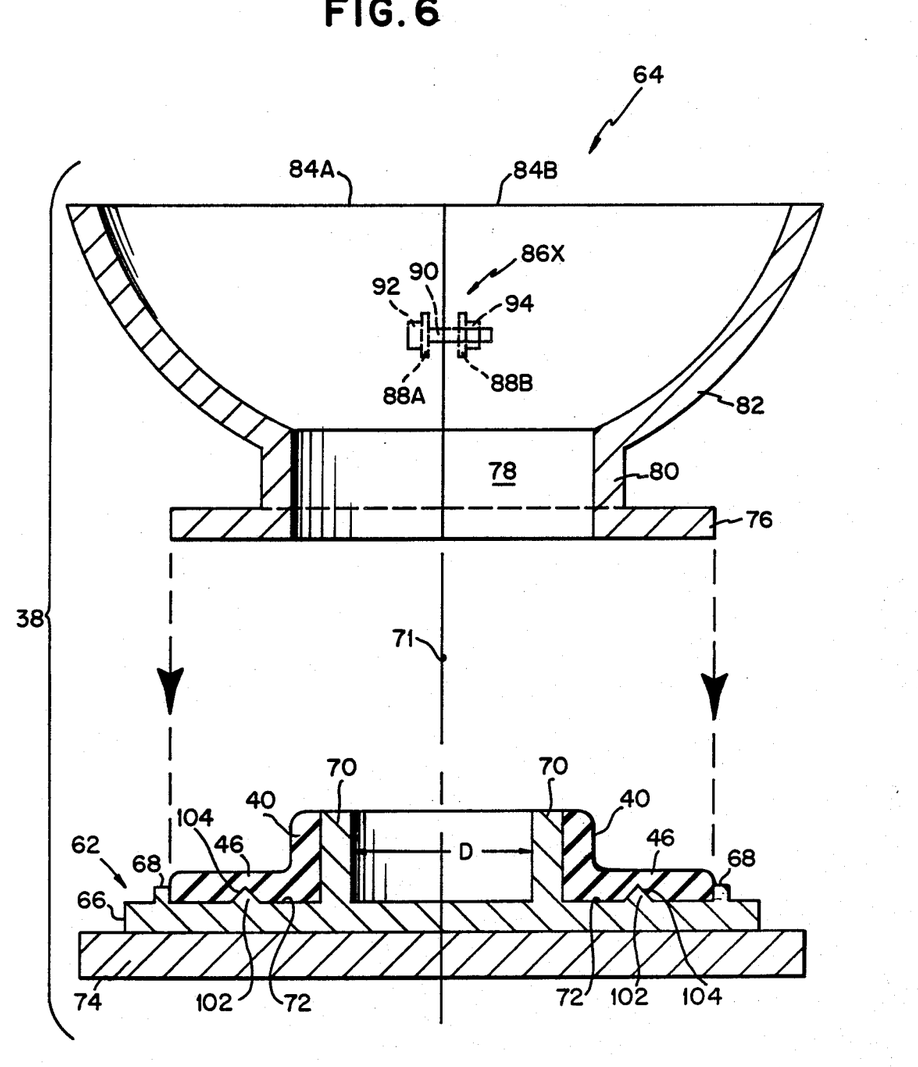
FIG. 6 is a sectional side view of a three-piece die during the forming process of a manhole frame.
Figure 7:
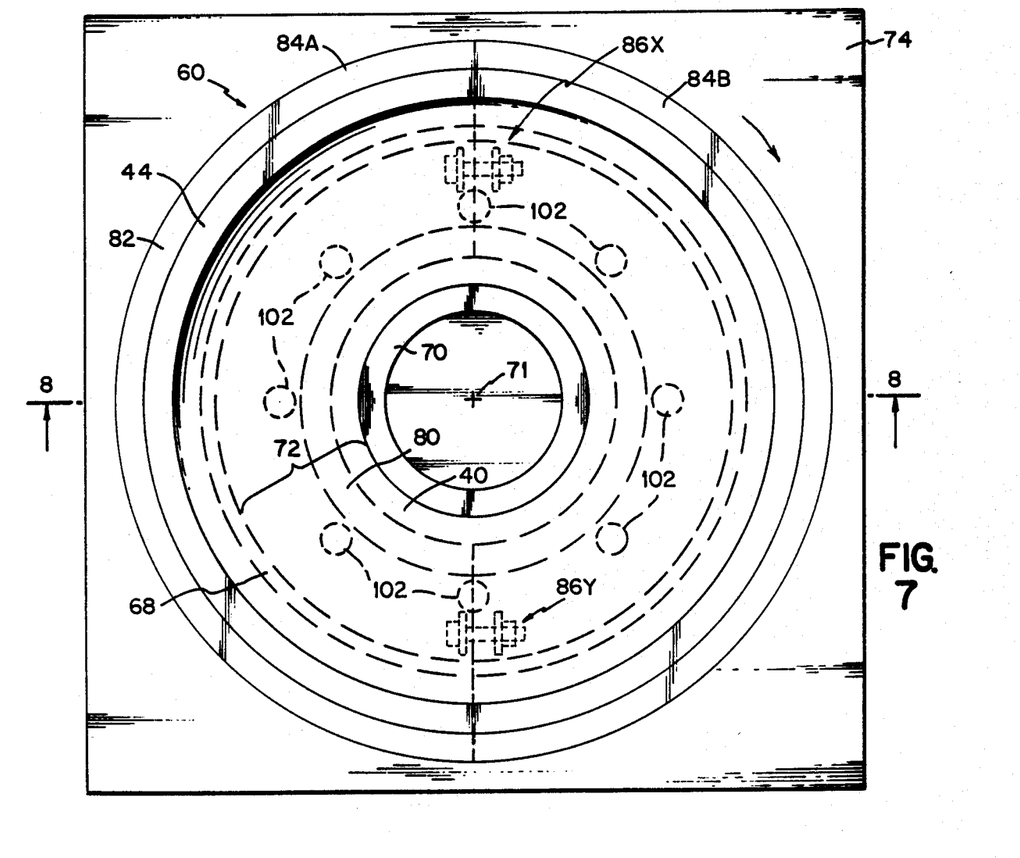
FIG. 7 is a top view of the three-piece die with the formed manhole frame between the three pieces of the die.
Figure 8:
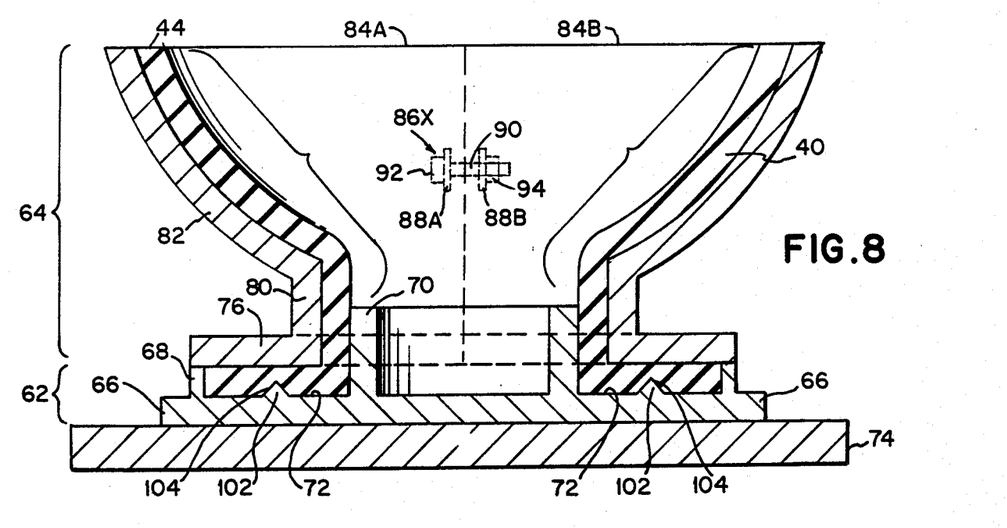
FIG. 8 is a view taken through line 8—8 of FIG. 7.

Manhole frame 38 can be produced on a metal three-piece die 60, which is illustrated in FIGS. 6, 7, and 8. Three-piece die 60 includes a bottom die piece 62 and a pair of top die pieces 64A and 64B adapted to be joined together in a manner to be explained to form an operational top die piece. FIG. 6 illustrates a mid-step in the production of manhole frame 38 with neck 40 and manhole flange 46 having been partially formed on bottom die piece 62 and with integrally joined top die pieces 64A and 64B in the process of descending onto bottom die piece 64.

FIGS. 7 and 8 illustrate another step in the production of manhole frame 38 with joined top die pieces 64A and 64B having been placed on top of bottom die piece 62 and collar 44 having been formed on the inner surface of upper die piece 64 so that manhole frame 38 is almost completely formed except for subsequent drilling of bolt holes 52.

Bottom die piece 62 includes a horizontal base wall 66, an outer matrix ring 68 and an inner matrix ring 70, each being centered at a common a vertical axis 71. Outer matrix ring 68 comprises an outer circular wall having an inner surface that extends vertically upwardly from base wall 66; and inner matrix ring 70 comprises an inner circular wall having an outer surface that extends vertically upwardly from base wall 66. The horizontal upper surface of base wall 66 and the inner and outer surfaces of outer an inner matrix rings 68 and 70 define a manhole flange cavity 72 in which manhole flange 46 is formed. The outer surface of inner matrix ring 70 is the forming surface for a portion of the inner surface of neck 40. The height of outer matrix ring 68 from base wall 66 is generally the same as the thickness of manhole flange 46, and the height of inner matrix ring 70 from base wall 66 is greater than that of outer matrix ring 68 and less than the axial length of neck 40. Bottom die piece 62 is set upon a rotatable table 74 operable by mechanisms and power sources not shown.

Joined top die pieces 64A and 64B include a preferably circular bottom matrix flange 76 having a circular center hole 78 having a vertical axis coextensive with axis 71, matrix flange 76 being alignable relative to generally horizontal base wall 66 of bottom die piece 68; a cylindrical matrix wall 80 having top and bottom rims, said bottom rim being connected to matrix flange 76 at the inner rim of center hole 78 and having an axis aligned with axis 71; and a curved, tapered, outwardly and upwardly dished matrix skirt 82 configured as a segmented sphere and having a bottom side connected to the top edge of cylindrical matrix wall 80. The bottom surface of matrix flange 76 is the forming surface of the bottom surface of manhole flange 46; the inner surface of cylindrical matrix wall 80 is the forming surface of the outer surface of neck 40; and the inner surface of matrix skirt 80 is the forming surface of the outer surface of collar 44. As shown in FIG. 8, joined top die pieces 64A and 64B as the operational top die piece is placed in contact with outer matrix ring 68 and is aligned with bottom die piece 62 along common axis 71. The inner surface of cylindrical matrix wall 80 of joined upper die pieces 64A and 64B is spaced from the outer surface of inner matrix ring 70 of bottom die piece 62 at a distance that is the thickness of neck 40 of manhole frame 38, that is, the height of outer matrix ring 68 relative to bottom wall 66.

Paired top die pieces 64A and 64B are of equal and opposite dimensions and are held in an assembled position ready for the molding operation by a pair of opposed dielocks 86X and 86Y connected to the outer surface of matrix skirt 82 between the top edge of skirt 82 and the top edge of neck 80. Each die-lock 86X and 86Y includes a pair of posts 88A and 88B connected to top die pieces 64A and 64B, respectively, each post having a bolt hole, a bolt 90 extending through the bolt holes, bolt 90 having a head 92 and an opposed threaded end, and a nut 94 threaded onto the threaded end of bolt 90 so as to draw and hold the particular side of top die pieces 64A and 64B tightly together, so that when both die-locks 86X and 86Y are in their locked, or bolted, modes top die pieces 64A and 64B are unified and ready for the molding process. When both die-locks 86X and 86Y are in their unlocked, or unbolted, modes, with bolts 90 removed from the posts of both dielocks 86X and 86Y, formed manhole frame 38 can be removed from three-piece die 60.

Figure 9A:
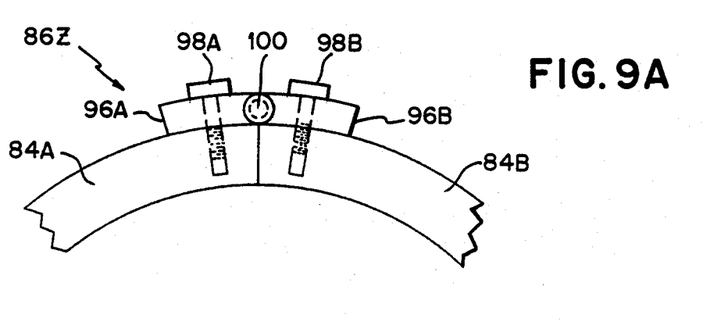
FIG. 9A is a detail view of an alternate rotatable locking element of the top piece of the die in a closed mode.
Figure 9B:
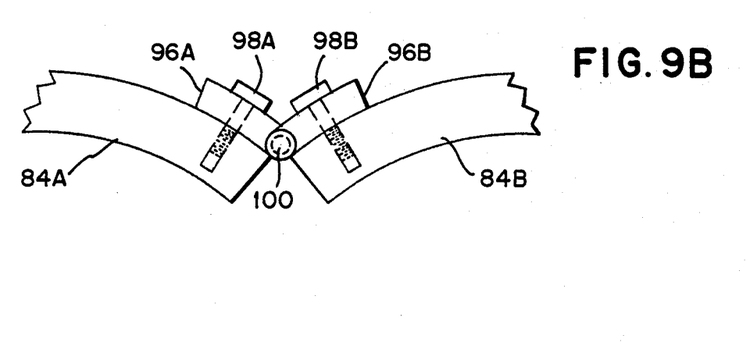
FIG. 9B is a detail view of the locking element illustrated in FIG. 6A in an open mode.

FIGS. 9A and 9B illustrate a jointed die-lock 86Z that can optionally be used in place of die-lock 86X. Dielock 86Z includes a pair of hinge fasteners 96A and 96B, which are suitably connected to the outer surfaces of top die pieces 64A and 64B, respectively, and a pivot, or joint, 98, about which top die pieces; 64A and 64B rotate between open and closed positions Thus, only die-lock 86Y need be bolted or unbolted when die-lock 86Y is unbolted, dies 64A and 64B can be rotated about joint 98 so as to rotate the operational top die piece from its locked, or closed, mode ready for the molding process to an open, or unlocked, mode, wherein formed manhole frame 38 can be removed from three-piece die 60.

Base wall 66 of bottom die piece 62 is preferably provided with a plurality of upwardly extending conical protrusions 102 that extend into manhole flange cavity 72 and cause conical recesses 104 to be formed along the bottom side (top side when viewed in the orientation of FIG. 4) of manhole flange 46. Conical recesses 104 are located in accordance with the location of bolt holes 52 shown in FIG. 4. As will be discussed later, bolt holes 52 are formed by a drill that is directed to the proper positions by conical recesses 104.

The process of producing manhole frame 38 using three-piece die 60 includes the following steps:

(a) placing bottom die piece 62 onto rotatable table 74;

(b) preparing an operational top die piece by joining top die pieces 64A and 64B together by bolting die-locks 86X and 86Y, or by rotating top die pieces 64A and 64B together about jointed die-lock 84Z and bolting die-lock 86X;

(c) activating the rotatable table so that it slowly turns;

(d) spraying the surfaces defining manhole flange cavity 72 and the outer surface of inner matrix ring 70 with a thin layer, preferably approximately 0.10 in., of catalyzed polyester resin so that the outer surface of manhole frame 38 to be formed will have a glossy surface;

(e) spraying the surfaces defining manhole flange cavity 72 and the outer surface of inner matrix ring 70 with a liquidized nonmetal molding material; the liquidized nonmetal molding material is preferably catalyzed resin reinforced with chopped fiberglass, with application preferably made with a three spout spray gun known in the art, one spout being for applying a liquid catalyst, one spout being for applying a liquid resin, and one spout being for applying chopped fiberglass; other liquidized molding material can include plastics such as epoxy resin and polypropylene;

(f) rolling out the liquidized molding material, preferably with the use of sharp serrated circular rollers, in order to completely wet any reinforcing material and to eliminate air inclusions;

(g) repeating steps (e) and (f) until the liquidized molding material fills manhole flange cavity 72 to overflowing;

(h) deactivating the rotatable table;

(i) placing joined top die pieces 64A and 64B upon bottom die piece 62 centered at axis 71 so that excess liquidized molding material lying in the area of manhole flange cavity 72 is forced from bottom die piece 62 so that air inclusions are eliminated; joined top die pieces 64A and 64B are sufficiently heavy so as to force the excess liquidized molding material from bottom die piece 62;

(j) activating the rotatable table; axis 71 being aligned with axis 51 of to be formed manhole frame 38 (FIGS. 3 and 4).

(k) spraying the inner surfaces of cylindrical matrix wall 80 and skirt 82 with a thin layer, approximately 0.10 in., of catalyzed polyester resin in order to give the surface of manhole frame 38 a glossy surface;

(l) spraying the inner surfaces of cylindrical matrix wall 80 and skirt 82 with the liquidized molding material in the manner set forth in step (e);

(m) rolling out the liquidized molding material sprayed on in step (m) in order to eliminate air inclusions and in order to completely wet any reinforcing material mixed with the liquidized molding material; during rolling out the curvature of skirt 82 is followed;

(n) repeating steps (l) and (m) until the projected wall thicknesses of neck 40 and manhole 42 of projected manhole frame 38 are attained;

(o) allowing the liquidized moldable material to harden;

(p) removing bottom die piece 62 from formed manhole frame 38 by lifting joined top die pieces 64A and 64B away from bottom die piece 62 along with formed manhole frame 38;

(q) removing joined top die pieces 64A and 64B from manhole frame 38 by first unconnecting die-locks 86X and 86 by freeing and removing bolts 90 and then pulling joined top die pieces 64A and 64B apart so as to free manhole frame 38; or, when jointed die-lock 86Z is used in place of die-lock 86Y, by unsecuring die-lock 86X and rotating joined top die pieces 64A and 64B apart about jointed die-lock 86Z so as to free manhole frame 38;

(r) inverting manhole frame 38 so that flange 46 is on top and collar 44 is on the bottom; and (s) drilling bolt holes 52 through manhole flange 46 at equal circular intervals concentric around axis 51, the intervals being preferably indicated at conical recesses 104 formed by conical protrusions 102.

The surfaces defining manhole flange cavity 72 and the outer surface of inner matrix ring 70 of the joined top die and the inner surfaces of cylindrical matrix wall 80 and skirt 82 with a release agent such as teflon is performed before the steps set forth above. One spraying is sufficient for a large number of molding processes The embodiment of the invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:

1. A method of making an access-hole frame for a spherical tank made of a moldable, nonmetal material, the access-hole frame including a cylindrical neck having a neck axis and circular top and bottom edges as oriented with the spherical tank and forming a cylindrical access hole, an outwardly extending, partly spherical collar connected to the bottom edge of the neck, and a radially outwardly extending access-hole flange having top and bottom sides an connected to the top edge of the neck, comprising the following steps:

(a) placing a bottom die piece onto a rotatable table; the bottom die means including a bottom die piece having a horizontal base wall, an outer matrix ring connected to the base wall, and an inner matrix ring connected to the base wall, the outer and inner matrix rings being centered at a common vertical axis adapted to be aligned with the axis of the neck of the to be formed access-hole frame, the outer matrix ring having an inner surface that extends vertically upwardly from the base wall; the inner matrix ring having an outer surface that extends vertically upwardly from the base wall; the base wall having an upper surface, the upper surface and the inner and outer surfaces of the outer and inner matrix rings defining an access-hole-flange cavity in which the access-hole flange is formed;

(b) preparing an operational top die piece by joining a pair of top die pieces together by connecting at least one die-lock connected to the pair of top die pieces; the operational top die piece including a circular matrix flange having a circular center hole having an axis aligned with the vertical axis of the bottom die piece, the matrix flange being adapted to be placed in contact with the outer matrix ring of the bottom die piece and alignable with the horizontal base wall of the bottom die piece; the operational top die further including a cylindrical matrix wall having top and bottom rims, the bottom rim being connected to the matrix flange at the inner rim of the center hole, the cylindrical matrix wall having an axis coextensive with the vertical axis, the neck of the accesshole frame having a thickness, the cylindrical matrix wall having an inner surface which is spaced from the outer surface of the inner matrix ring of the bottom die piece at a distance that is the thickness of the neck; the operational top die further including an upwardly and outwardly dished matrix skirt configured as a segmented sphere and having top and bottom sides, the bottom side being connected to the top rim; wherein as mounted with the spherical tank the access-hole flange has a bottom surface, the neck has an outer surface, and the collar has an outer surface; wherein the matrix flange has a bottom surface which is the forming surface of the bottom surface of the access-hole flange; wherein the cylindrical matrix wall has an inner surface which is the forming surface of the outer surface of the neck; and wherein the matrix skirt has an inner surface which is the forming surface of the outer surface of the collar;

(c) activating the rotatable table so that it slowly turns;

(d) then spraying the surfaces defining the access-hole flange cavity and the outer surface of the inner matrix ring with a thin layer, preferably approximately 0.10 in., of catalyzed polyester resin so that the outer surface of the access-hole frame to be formed will have a glossy surface;

(e) then spraying the surfaces defining the access-hole flange cavity and the outer surface of inner matrix ring with a liquidized nonmetal molding material and a reinforcing material;

(f) then rolling out the liquidized molding material in order to completely wet the reinforcing material and to eliminate air inclusions;

(g) repeating steps (e) and (f) until the liquidized molding material fills the access-hole flange cavity to overflowing;

(h) then deactivating the rotatable table;

(i) then placing the joined top die pieces upon the bottom die piece centered at an axis so that excess liquidized molding material lying in the area of the access-hole flange cavity is forced from the bottom die piece so that air inclusions are eliminated; the joined top die pieces being sufficiently heavy so as to force the excess liquidized molding material from the bottom die piece;

(j) then activating the rotatable table;

(k) then spraying the inner surfaces of the cylindrical matrix wall and the skirt with a thin layer, approximately 0.10 in., of catalyzed polyester resin in order to give the surface of the access-hole frame a glossy surface;

(l) then spraying the inner surfaces of the cylindrical matrix wall and the skirt with the liquidized molding material in the manner set forth in step (e);

(m) then rolling out the liquidized molding material sprayed on in step (l) in order to eliminate air inclusions and in order to completely wet the reinforcing material mixed with the liquidized molding material; during rolling out the curvature of the skirt is followed;

(n) repeating steps (l) and (m) until the projected wall thicknesses of the neck and the access-hole of the projected access-hole frame are attained;

(o) then allowing the liquidized moldable material to harden;

(p) then removing the bottom die piece from the formed access-hole frame by lifting the joined top die pieces away from the bottom die piece along with the formed access-hole frame;

(q) removing the joined top die pieces from the accesshole frame by first unconnecting the die-locks by freeing and removing the bolts and then pulling the joined top die pieces apart so as to free the access-hole frame;

(r) then inverting the access-hole frame so that the flange is on top, and the collar is on the bottom; and (s) then drilling bolt holes through the access-hole flange at equal circular intervals concentric around the axis.

2. The method set forth in claim 1, wherein the non-metal moldable material is catalyzed resin reinforced with chopped fiberglass.

3. The method set forth in claim 1, wherein the non-metal moldable material is a plastic.

4. The method set forth in claim 3, wherein the plastic is epoxy resin.

5. The method set forth in claim 3, wherein the plastic is polypropylene.

6. The method set forth in claim 1, wherein said horizontal base wall of said bottom die piece is provided with a plurality of upwardly extending conical protrusions that extend into said manhole flange cavity, wherein conical recesses are formed along the top side of said access-hole flange as oriented with the spherical tank, the protrusions being located in accordance with the location of bolt holes to be drilled through said flange.

7. The method set forth in claim 1, wherein the at least one die-lock in step (b) includes another die-lock connected to the pair of top die pieces positioned opposed to the at least one die-lock.

8. The method set forth in claim 1, further including a jointed die-lock connected to the pair of top die pieces positioned opposed to the at least one die-lock, whereby only the at least one die-lock need be connected and unconnected when joining and unjoining the pair of top die pieces.

9. The method set forth in claim 1, further including the step of spraying the surfaces defining said access-hole flange cavity and the outer surface of said inner matrix ring of said bottom die and said inner surfaces of said cylindrical matrix wall and said skirt of said operative top die with a release agent and allowing the release agent to gel.

10. A method of making an access-hole frame for a tank, such as a spherical tank, made of a moldable, nonmetal material, the access-hole frame including a neck having an axis and top and bottom edges as oriented with the tank and forming an access hole with an outwardly extending collar connected to the bottom edge of the neck, and a radially outwardly extending access-hole flange connected to the top edge of the neck, comprising the following steps:

(a) placing a bottom die means onto a table adapted to rotate; the bottom die means including a bottom die piece having a horizontal base wall, and inner and outer matrix rings connected to the base wall, said matrix rings being centered at a common vertical axis adapted to be aligned with the axis of the neck of the to be formed access-hole frame, the inner and outer matrix rings having surfaces that extend vertically upwardly from the base wall; the base wall having an upper surface and together with the surfaces of the inner and outer matrix rings defining an access-hole-flange cavity in which the access-hole flange is formed;

(b) preparing an operational top die means by joining a pair of top die pieces together by means of at least one die-lock connected to said pair of top die pieces; the operational top die means including a matrix flange having a central aperture having an axis aligned with the vertical axis of the bottom die piece, the matrix flange being adapted to be placed in contact with the outer matrix ring of the bottom die piece and alignable with the horizontal base wall of the bottom die piece; the operational top die means further including a matrix wall having top and bottom rims, the bottom rim being connected to the matrix flange at the inner rim of the central aperture, the matrix wall having an axis coextensive with the vertical axis; the operational top die means further including an upwardly and outwardly directed matrix skirt with top and bottom sides, with the bottom side being connected to the top rim;

(c) rotating said table containing said bottom die means while spraying the surfaces defining the access-hole flange cavity and the outer surface of said inner matrix ring with nonmetal molding material, rolling out the non-metal molding material to eliminate air inclusions, and repeating the steps of spraying and rolling until the non-metal molding material fills the access-hole flange cavity to overflowing;

(d) then placing and aligning the joined top die pieces upon and about the bottom die piece about its axis, whereby excess molding material in the area of the access-hole flange cavity is forced from the bottom die piece;

(e) then rotating said table while spraying the inner surfaces of the matrix wall and the skirt with said nonmetal molding material and subsequently rolling out same until a desired wall thickness of the neck and said skirt is attained;

(f) then allowing the molding material to harden;

(g) then removing the joined top die pieces and the bottom die pieces from the access-hole frame; and (h) then inverting the access-hole frame and providing bolt holes through the access-hole flange at equal circular intervals concentrically around the neck axis.

* * * * *